(No Model.)
F. LAMBERT.
MECHANISM FOR OPERATING REGISTERING DEVICES OF METERS.
No. 588,924.  Patented Aug. 24, 1897.
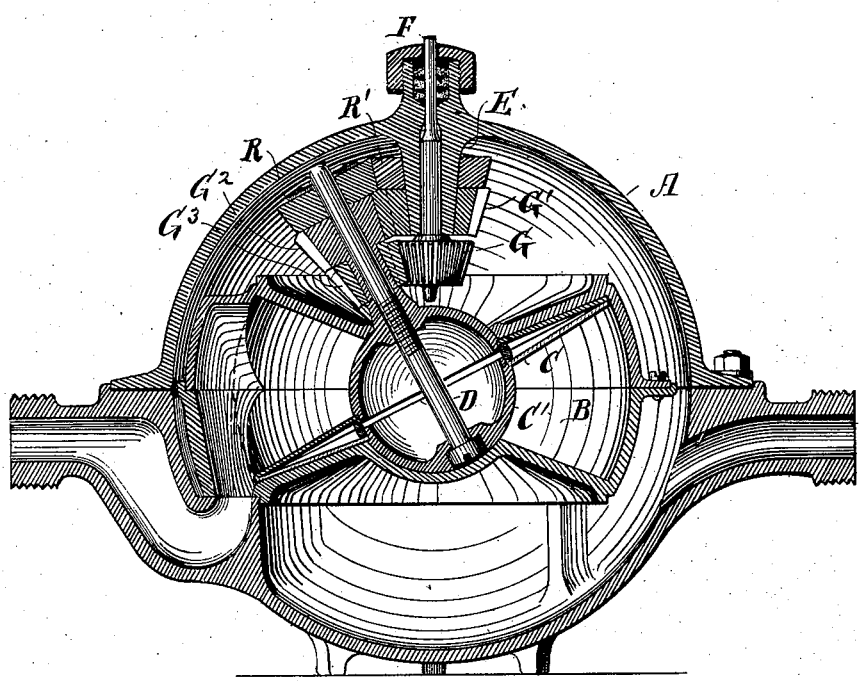
WITNESSES:
INVENTOR
Frank Lambert
BY
Edwin H. Brown
HIS ATTORNEY.

UNITED STATES PATENT OFFICE.

FRANK LAMBERT, OF BROOKLYN, NEW YORK, ASSIGNOR OF ONE-HALF TO JOSEPH W. KAY, OF SAME PLACE.

MECHANISM FOR OPERATING REGISTERING DEVICES OF METERS.

SPECIFICATION forming part of Letters Patent No. 588,924, dated August 24, 1897.

Application filed February 6, 1895. Serial No. 537,463. (No model.)

*To all whom it may concern:*

Be it known that I, FRANK LAMBERT, of Brooklyn, in the county of Kings and State of New York, have invented certain new and useful Improvements in Mechanism for Operating the Registering Devices of Meters, of which the following is a specifiation.

My invention relates to that class of meters known as "oscillating" or "nutating" disk meters, in which a piston in the form of a disk suitably supported is given a motion of nutation, and this motion is transmitted in a manner to indicate or register the quantity of liquid passing through the meter.

My invention more particularly concerns improvements in the mechanism for transmitting the motion of the nutating piston to the indicating or registering device.

I will describe a mechanism for transmitting the motion of the nutating piston embodying my improvement, and then point out the novel features in the claims, reference being had to the accompanying drawing, which represents such a mechanism.

A designates the outer casing of a meter, B the piston-chamber, and C the nutating piston provided with a ball C' and suitably supported in the piston-chamber to permit its having a motion of nutation.

D is the spindle of the piston, by means of which the motion of the latter is transmitted to the indicating or registering device. All of these parts may be of any approved or desirable construction.

E is a stationary sleeve dependent from the upper portion of the meter-casing. It may be made integral with such casing or it may be independent therefrom and secured by any suitable means.

F is the driving-shaft of the indicating or registering device journaled in the sleeve E in line with the center of the support of the piston, connected it at its upper extremity to the index-arm or other member of the indicating or registering device and at its lower extremity supporting a bevel-wheel G. A stationary bevel-gear G' is secured to the sleeve E concentric with the axis of the shaft F. During the motion of the piston C the spindle D, carried by the latter, generates the surface of a cone about the shaft F as an axis.

$G^2$ is a bevel-gear mounted upon the spindle D to rotate thereon and meshing with the stationary gear G', supported on the sleeve E.

$G^3$ is a second bevel-gear mounted to rotate upon the spindle D, but rigidly secured to the gear $G^2$. For instance, the hub of the latter gear may be extended and the gear $G^3$ secured to this hub. The gear $G^3$ meshes with the gear G, carried by the shaft F. During the motion of the piston C the gear $G^2$, meshing with the stationary gear G', is rotated upon the spindle D, driving at the same time the gear $G^3$. The latter gear, meshing with the gear G, causes this gear to rotate, and as a consequence drives the shaft F and the indicating or registering mechanism.

By suitably proportioning the several gears it is possible to create a very material difference between the number of complete rotations of the shaft F and the number of complete revolutions of the spindle D around the shaft F.

I will, for the sake of illustration, assume certain ratios between the diameters of the several gears, or, what is equivalent thereto, the teeth provided on the gears, in order to demonstrate a reduction in movement which may be attained by the use of my improvement. Assume, for instance, that the gear G has twelve teeth, the gear G' thirteen teeth, the gear $G^2$ twelve teeth, and the gear $G^3$ eleven teeth. For one revolution of the spindle D around the shaft F the gear $G^2$, since it meshes with the stationary gear G', will have made one and one-twelfth complete rotations relatively to its own axis. Consequently the gear $G^3$ will likewise have made one and one-twelfth complete rotations. As the gear $G^3$ meshes with the gear G and as it will require twelve-elevenths or one and one-eleventh rotations of the gear $G^3$ to keep the gear G stationary as the former is revolved about the latter, it is evident that the gear $G^3$ is held back by an amount equal to the difference of these fractions, or one one-hundred-and-thirty-second of a rotation. It is this portion of a rotation of the gear $G^3$ which actuates the gear G and consequently the shaft F. The corresponding movement for the shaft F is easily found to be one one-hundred-and-forty-fourth of a rotation. Therefore every complete rotation of the shaft F will require one hundred and forty-four revolutions of the spindle D about the shaft F. This ratio can of course be varied by changing the ratio of the gears. This arrangement of mechanism for effecting the reduction of the movement, which I term an "epicyclic train," since the revolving gears revolve about a common axis, is simple, positive, and well adapted to this form of meter, as a complication of parts is avoided, while at the same time they practically contribute to make a positive angle-controlling action. If so desired, however, two beveled disks R R' can be fitted to the spindle D and the sleeve E. Either or both of these disks may be fixed to or rotatably mounted upon its respective spindle or sleeve.

Having described my invention, what I consider as new, and desire to secure by Letters Patent, is—

1. In a nutating-piston meter, the combination with the piston thereof, of a train of speed-reducing gearing connected with the registering mechanism, one or more of the elements of which train are carried by the piston, substantially as specified.

2. The combination in a water-meter of the nutating type of a disk-chamber, a nutating disk therein, a disk-spindle projecting outside of said chamber, an inclosing case for said chamber, a rotary shaft extending through a wall of said case, a gearing G, G' G$^2$, G$^3$ between said spindle and said shaft, substantially as described.

3. The combination in a water-meter of the nutating type having a disk-chamber, a nutating disk therein, and a disk-spindle extending outside of said chamber, an inclosing case for said chamber, a fixed sleeve on the inner side thereof, a gear G' carried by said sleeve, a shaft F journaled in said sleeve and carrying gear G, on said disk-spindle gears G$^2$, G$^3$ engaging with said gears G, G', substantially as described.

In testimony whereof I have signed my name to this specification in the presence of two subscribing witnesses.

FRANK LAMBERT.

Witnesses:
 ROBERT O. WELCH,
 HENRY C. FOLGER.